(12) United States Patent
Cullen

(10) Patent No.: US 10,863,676 B2
(45) Date of Patent: Dec. 15, 2020

(54) BAGGING MACHINE

(71) Applicant: SRC Innovations LLC, Chinook, WA (US)

(72) Inventor: Steven R. Cullen, Chinook, WA (US)

(73) Assignee: SRC Innovations, LLP, Chinook, WA (US)

( * ) Notice: Subject to any disclaimer, the term of this patent is extended or adjusted under 35 U.S.C. 154(b) by 0 days.

(21) Appl. No.: 16/517,075

(22) Filed: Jul. 19, 2019

(65) Prior Publication Data

US 2020/0008362 A1    Jan. 9, 2020

Related U.S. Application Data

(62) Division of application No. 15/145,471, filed on May 3, 2016, now Pat. No. 10,398,087.

(60) Provisional application No. 62/156,765, filed on May 4, 2015.

(51) Int. Cl.
| | |
|---|---|
| *A01F 25/14* | (2006.01) |
| *B65G 33/30* | (2006.01) |
| *B65B 27/12* | (2006.01) |
| *B65B 65/02* | (2006.01) |

(52) U.S. Cl.
CPC ............ *A01F 25/14* (2013.01); *B65B 27/125* (2013.01); *B65B 65/02* (2013.01); *B65G 33/30* (2013.01); *A01F 2025/145* (2013.01)

(58) Field of Classification Search
CPC .......... B65G 3/00; B65G 33/18; B65G 33/30; B65B 1/24; B65B 63/02; B65B 1/04; B65B 1/20; B65B 43/26; B65B 27/125; B65B 65/02; A01F 25/14; A01F 2025/145
USPC .......... 198/662, 669; 53/439, 473, 459, 527, 53/530, 570; 100/41, 91, 226, 242
See application file for complete search history.

(56) References Cited

U.S. PATENT DOCUMENTS

| | | | |
|---|---|---|---|
| 3,687,061 A | 8/1972 | Eggenmuller et al. | |
| 4,046,068 A | 9/1977 | Eggenmuller et al. | |
| 4,621,666 A | 11/1986 | Ryan | |
| 4,724,876 A * | 2/1988 | Ryan ................. | A01F 25/14 100/144 |
| 4,899,867 A * | 2/1990 | Ryan ................. | A01F 25/14 141/114 |
| 5,159,877 A | 11/1992 | Inman | |
| 5,178,061 A | 1/1993 | Alonso-Amelot | |
| 6,672,034 B1 | 1/2004 | Wingert | |
| 6,907,714 B2 * | 6/2005 | Cullen ............... | A01F 25/14 53/530 |
| 7,266,936 B2 * | 9/2007 | Wingert ............. | A01F 25/183 100/100 |
| 7,926,245 B2 | 4/2011 | Cullen | |
| 8,065,859 B1 * | 11/2011 | Wingert ............. | A01F 25/183 100/191 |
| 10,398,087 B2 * | 9/2019 | Cullen ............... | B65B 65/02 |
| 2009/0241480 A1 | 10/2009 | Cullen | |

\* cited by examiner

*Primary Examiner* — James R Bidwell
(74) *Attorney, Agent, or Firm* — Barnes & Thornburg LLP; Ryan L. Marshall

(57) ABSTRACT

A rotor for bagging silage is disclosed. The rotor has at least four sets of tines forming double helixes with angular spacing between each set of tines. In some embodiments, the tines are spaced further apart and the rotor is rotated at a higher rotational speed.

17 Claims, 7 Drawing Sheets

BAGGING MACHINE

RELATED APPLICATIONS

The present patent document is a divisional application from U.S. application Ser. No. 15/145,471 filed May 3, 2016, now U.S. Pat. No. 10,398,087, issued Sep. 3, 2019, which claims the benefit of the filing date under 35 U.S.C. § 119(e) of Provisional U.S. Patent Application Ser. No. 62/156,765 filed May 4, 2015, which are hereby incorporated by reference.

BACKGROUND

1. Technical Field

The present disclosure relates to bagging systems and methods for bagging materials such as organic materials, silage, compost, grain, sawdust, dirt, sand, and other compactable materials.

2. Background Information

Agricultural feed bagging machines have been employed for several years to pack or bag silage and the like into elongated bags. In recent years, the bagging machines have also been used to pack or bag compost material and other materials into the elongated plastic bags. Two of the earliest bagging machines are disclosed in U.S. Pat. Nos. 3,687,061 and 4,046,068, the complete disclosures of which are incorporated herein by reference for all purposes. In these bagging machines, material is supplied to the forward or intake end of the bagging machine and is fed to a rotor. The rotor conveys and compresses the material into a tunnel onto which the bag is positioned, thereby filling the bag. The bagging machine moves forward at a controlled rate leaving the packed bag behind. The packing density of the material packed in the bag is determined and controlled by a number of factors including the rate at which the bagging machine moves forward and the rate at which the material is packed into the bag.

FIG. 1 illustrates a rear view of an existing bagging machine 100. In the description that follows, reference will be made to front and rear of the mobile bagging machine 100. The rear of the mobile bagging machine 100 is hereby defined as the end of the mobile bagging machine to which a bag may be fitted and is generally to the right in FIG. 1. In the description, reference may be made to a rearward direction. A rearward direction is one that is generally towards the area past the rear of the mobile bagging machine 100. The front of the mobile bagging machine 100 is hereby defined as the end of the mobile bagging machine 100 opposite the rear end and is generally to the left in FIG. 1. A forward direction is one that is generally toward an area past the front of the mobile bagging machine 100.

The mobile bagging machine 100 is includes a feed bin 102, a packing assembly 104, a tunnel assembly 106, and a chassis 108. In operation, material to be bagged is loaded into the feed bin 102. Throughout this application, the material being bagged will be referred to generally as silage, but silage is representative of any bulk material that could be packed in a bag. The feed bin 102 feeds the silage into the packing assembly 104 which packs the silage into a tunnel 110 of the tunnel assembly 106. A bag (not shown) is fitted about the tunnel assembly 106 and receives the packed silage. The bag may expand rearward as the silage is fed into it. The chassis 108 mounts the feed bin 102, packing assembly 104, and tunnel assembly 106, enabling them to be moved as a single unit. During the packing of silage into the tunnel 110, the chassis 108 moves forward at a desired rate thereby controlling the density of the packed silage. As the chassis 108 moves forward, the back end of the bag remains in place, expanding the bag longitudinally.

FIG. 2 illustrates an example of a current rotor 124 for use in the packing assembly 104 of FIG. 1. The packing assembly 104 is disposed at a bulkhead 118 of the feed bin 102 and includes the rotor 124 and a comb 128. The rotor 124 has a plurality of tines 126 and the comb 128 has a plurality of teeth 130 spaced apart by at least a width 132 of a tine 126. A torque source, such as a motor, engine, or external rotation provides torque to rotate the rotor 124. As the rotor 124 rotates, the plurality of tines 126 engage silage in the hopper 112 and push or drag the silage through the bulkhead 118 into the tunnel 110. The rotor 124 continues to rotate with the plurality of tines 126 passing from the tunnel 110 into the hopper 112 through the comb 128. Any silage caught in the plurality of tines 126 is removed by the comb 128 as the plurality of tines 126 pass between the teeth 130 of the comb 128.

Packing rotors for bagging machines have been in use for at least thirty-five years. Previous bagging machines have rotated the rotor 124 at a rate of between 17 revolutions per minute (RPM) and 60 RPM. In the past, different tine 126 placement patterns have been used, but most current designs use the double helical rotor 124 shown in FIG. 2. The performance of a bagging machine 100 is measured by the rate at which it packs silage into a bag per unit of time and by the quality of the fill. Ideally, the bagging machine 100 would fill a bag uniformly with no clumping.

As the bagging rate is increased, it becomes more difficult to achieve uniform bagging, causing lumps to form in the silage. Additionally, maximum capacity for a bagging machine 100 is typically found by rotating the rotor 124 at a rate of sixty RPM. Slower rates of rotation result in a decreased rate of fill, while faster rotation does not result in a substantial increase in fill rate, if at all. Additionally, the faster rotation of the rotor 124 may negatively impact the quality of the fill. It would be beneficial to develop a bagging machine 100 that could bag at a high quality level at a high rate of speed.

BRIEF SUMMARY

In a first aspect a rotor for use in a bagging machine is disclosed. The rotor includes a cylindrical body having a first end, a second end opposite the first end, and a cylindrical surface, a first plurality of tines extending from the cylindrical surface between the first and second end with the first plurality of tines forming a first partial double helical pattern in a first direction about the cylindrical surface, a second plurality of tines extending from the cylindrical surface between the first plurality of tines and the second end with the second plurality of tines forming a second partial double helical pattern in the first direction and having an angular offset relative to the first helical pattern, a third plurality of tines extending from the cylindrical surface between the second plurality of tines and the second end with the third plurality of tines forming a third partial double helical pattern in a second direction opposite the first direction, and a fourth plurality of tines extending from the cylindrical surface between the third plurality of tines and the second end with the third plurality of tines forming a fourth partial double helical pattern in the second direction and having an angular offset relative to the third helical pattern.

In some embodiments, the rotor further includes a first end tine between the first plurality of tines and the first end with the first end tine having an angular orientation matching an angular orientation of a tine within the first plurality of tines.

In some embodiments, the second plurality of tines is offset from the first plurality of tines by a quarter rotation.

In some embodiments, each tine in a plurality of tines is offset from another tine in the each plurality of tines by a distance greater than double the width of each tine. In some embodiments, each tine has a longitudinal position, and no two tines share the same longitudinal position.

In some embodiments, the tines of the first double helical pattern have a constant longitudinal spacing, and the tines from a first side of the double helical pattern align between tines from a second side of the double helical pattern. In some embodiments, the cylindrical body has a first pulley at the first end and a second pulley at the second end.

In another aspect a bagging machine is disclosed. The bagging machine includes a feed table, a bagging tunnel, and a packing assembly between the feed table and the bagging tunnel. The packing assembly includes a bulkhead including a comb having a plurality of teeth, a rotor configured to rotate about an axis and having a plurality of tines extending perpendicular to the axis with each tine of the plurality of tines aligning with a space between two teeth from among the plurality of teeth and no tine aligns with the same space as another tine, and a rotating drive coupled to the rotor.

In some embodiments, the rotor is a cylindrical body having a first end, a second end opposite the first end, and a cylindrical surface. A first plurality of tines extends from the cylindrical surface between the first end and the second end, the first plurality of tines forms a first partial double helical pattern in a first direction about the cylindrical surface. A second plurality of tines extends from the cylindrical surface between the first plurality of tines and the second end and the second plurality of tines form a second partial double helical pattern in the first direction and has an angular offset relative to the first helical pattern. A third plurality of tines extends from the cylindrical surface between the second plurality of tines and the second end and the third plurality of tines forms a third partial double helical pattern in a second direction opposite the first direction. A fourth plurality of tines extends from the cylindrical surface between the third plurality of tines and the second end and the third plurality of tines form a fourth partial double helical pattern in the second direction and have an angular offset relative to the third helical pattern.

In some embodiments, the rotating drive is coupled to a first end of the rotor through a first belt connection and a second end of the rotor opposite the first end through a second belt connection. In some embodiments, the drive turns the rotor at a speed greater than eighty revolutions per minute during operation.

In some embodiments, the drive is coupled to the rotor through a plurality of belts. In some embodiments, the rotating drive distributes power evenly between the first belt connection and the second belt connection.

In some embodiments the rotor is a cylindrical body having a first end, a second end opposite the first end, and a cylindrical surface, a first plurality of tines extending from the cylindrical surface between the first end and the second end with the first plurality of tines forming a first partial double helical pattern in a first direction about the cylindrical surface, and a second plurality of tines extending from the cylindrical surface between the first plurality of tines and the second end with the second plurality of tines forming a second partial double helical pattern in a second direction opposite the first direction.

In another aspect a method for bagging silage is disclosed. The method includes feeding silage onto a table, urging the silage into a bulkhead opening having a comb with a plurality of teeth and a rotor with a plurality of tines, and with each tine positioned to pass through a space between adjacent teeth with no two tines passing through the same space when the rotor is rotated, rotating the rotor, and directing silage from the rotor into a bag.

In some embodiments, the rotor is rotated at a speed greater than eighty revolutions per minute. In some embodiments, the method further includes rotating the rotor with a rotary drive coupled to a first end of the rotor and a second end of the rotor opposite the first end.

DETAILED DESCRIPTION

The described embodiments of the present disclosure will be best understood by reference to the drawings, wherein like reference numbers indicate identical or functionally similar elements. It will be readily understood that the components of the present disclosure, as generally described and illustrated in the figures herein, could be arranged and designed in a wide variety of different configurations. Thus, the following more detailed description, as represented in the figures, is not intended to limit the scope of the invention as claimed, but is representative of some embodiments disclosed herein.

Figure 1:
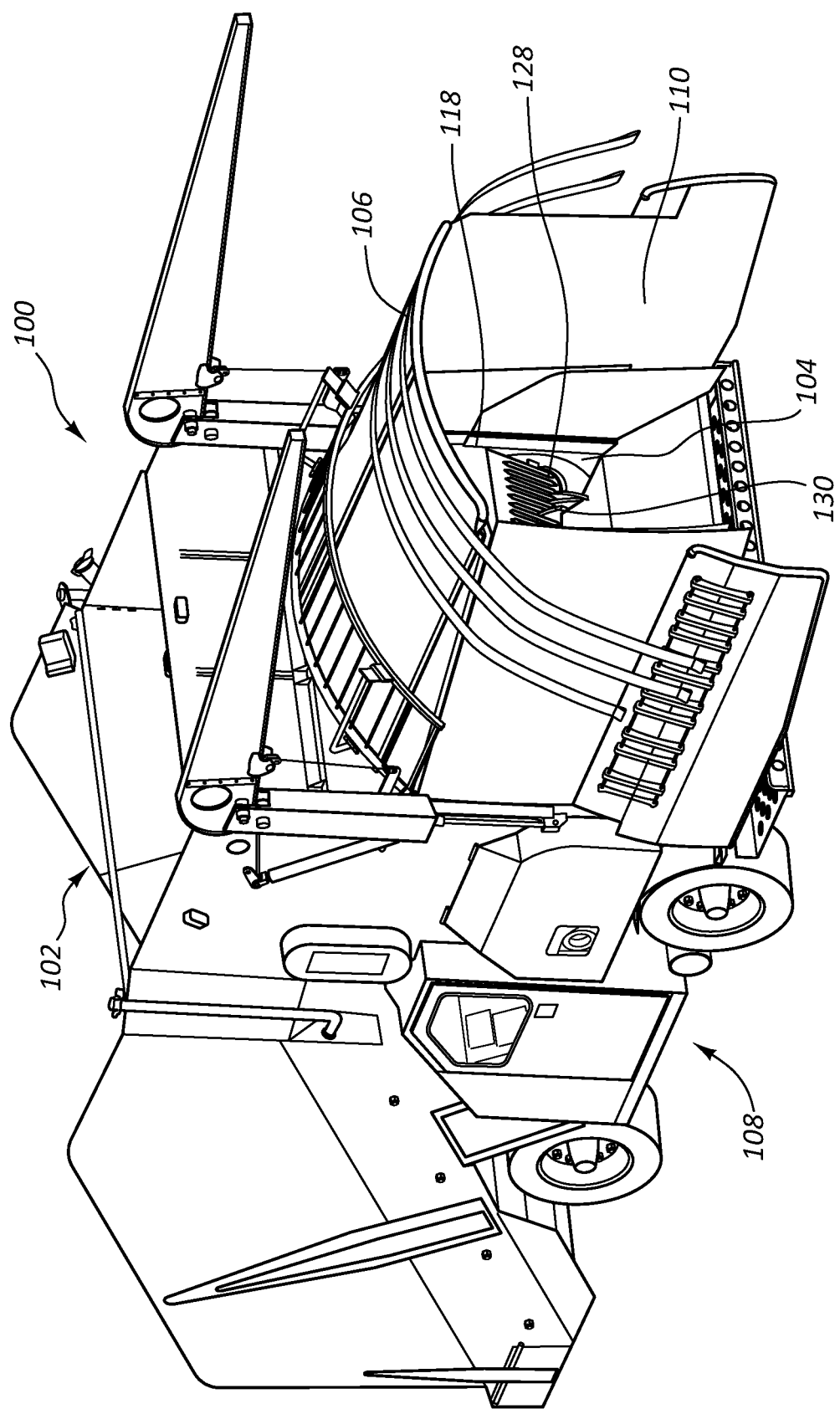
FIG. 1 illustrates the rear of a mobile bagging machine.
Figure 2:
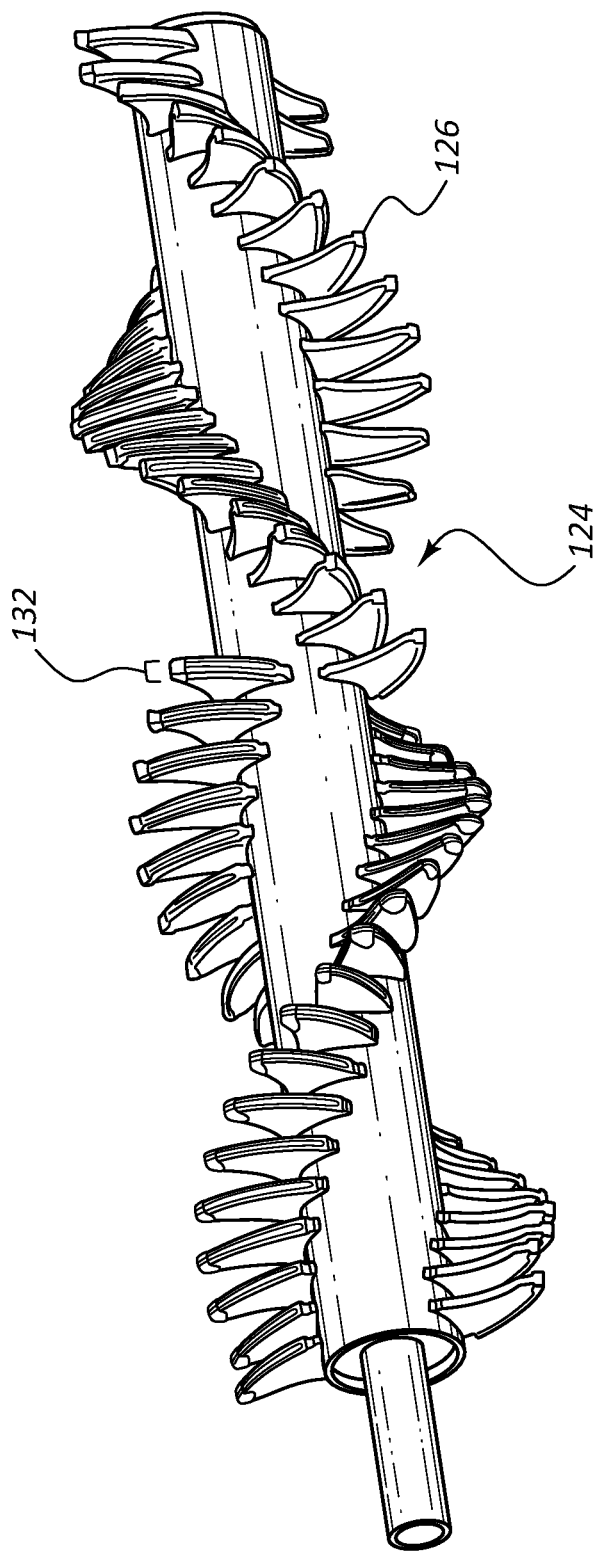
FIG. 2 illustrates an existing packing assembly of a mobile bagging machine.
Figure 3:
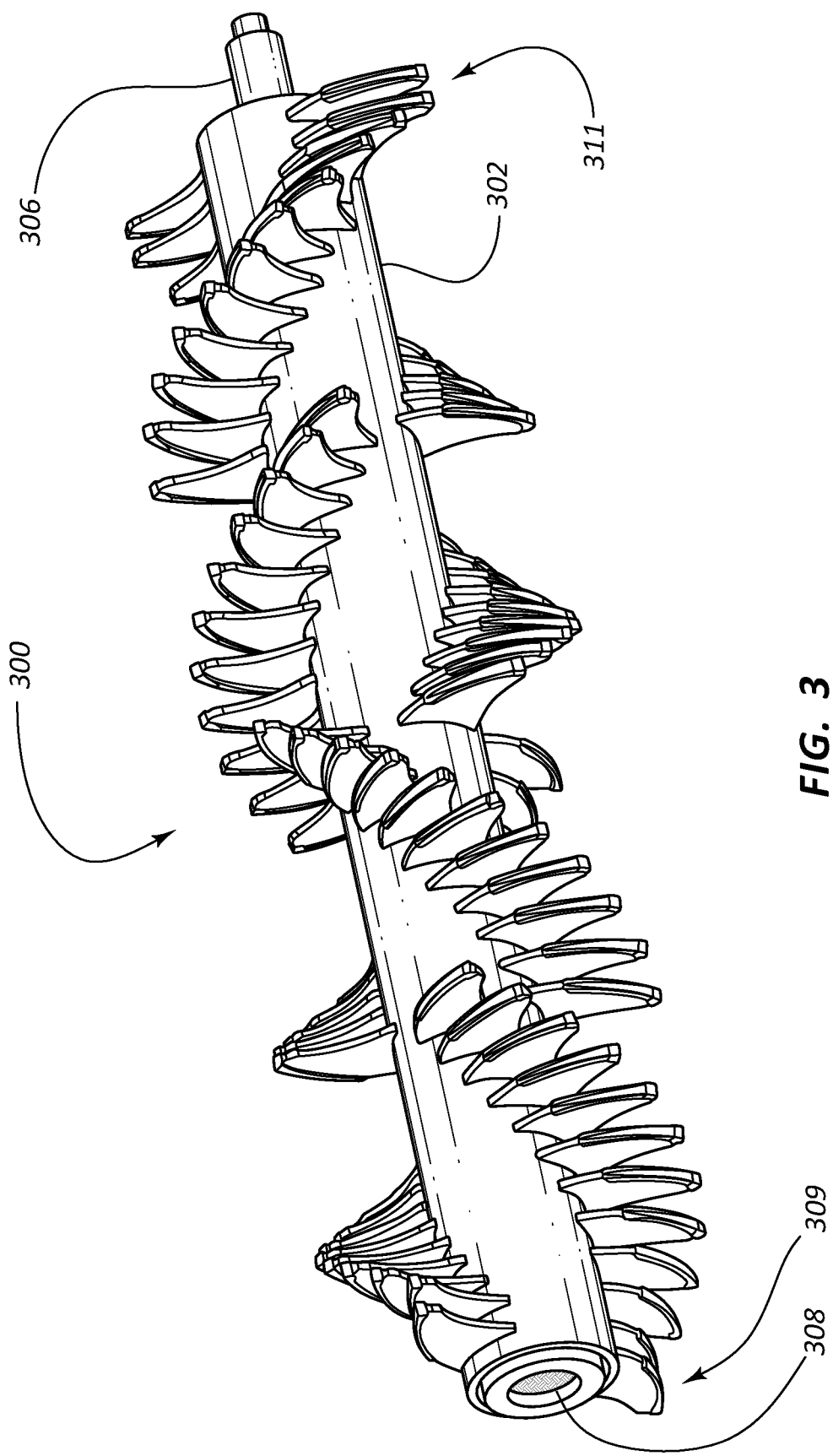
FIG. 3 illustrates an embodiment of a rotor for a bagging machine.
Figure 4:
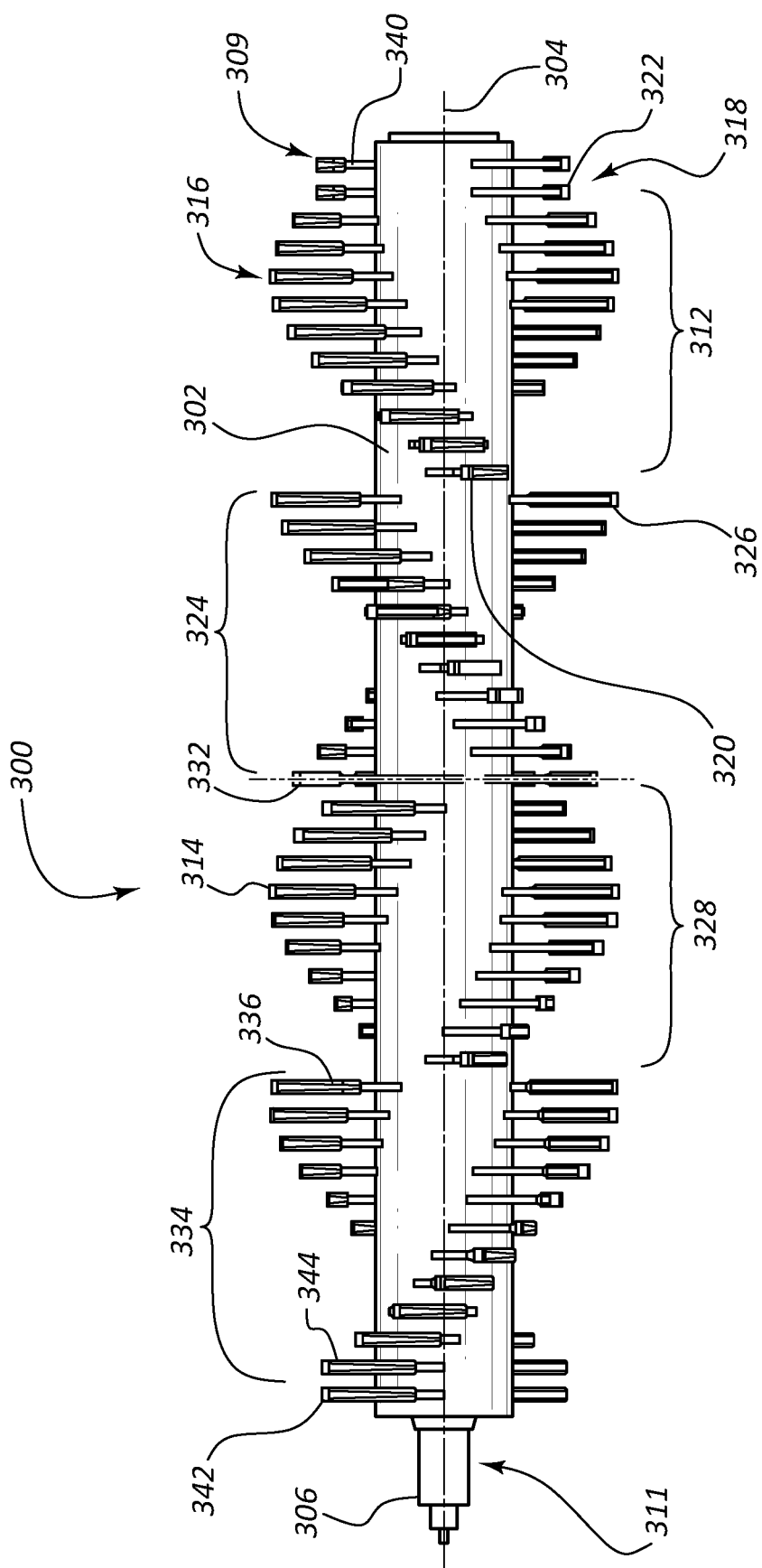
FIG. 4 illustrates another view of the rotor of FIG. 3.

FIG. 3 illustrates an embodiment of an improved rotor 300 for use in a mobile bagging machine 100. FIG. 4 illustrates a side view of the rotor of FIG. 3. The improved rotor 300 has been found to produce higher quality filled bags of silage and has less wear on the bagging machine 100 than the standard rotor design shown in FIG. 2.

The rotor 300 has a central cylindrical body 302 having a central axis 304 about which it is configured to rotate. The cylindrical body 302 has splines 308 at a first end 309 for connection to a source of torque. The cylindrical body 302 may have at least one cylindrical protrusion 306 at a second end 311 for receiving a bearing, allowing the cylindrical body 302 to rotate about its axis 304 when installed in a bagging machine 100. The second end 311 may be splined as well for connection to a torque source.

The cylindrical body 302 is divided along its length into sections of tines 314. A first section 312 of tines 314 extends away from the cylindrical body 302 between the first end 309 and the second end 311 of the rotor 300. The first section 312 has tines 314 that are arranged in a first, partial double helical pattern in a first angular direction about the cylindrical body 302. The first partial double helical pattern has a first set 316 of tines 314 extending from one side of the cylindrical body 302, and a second set 318 of tines 314 extending from an opposite side of the cylindrical body 302. Moving from the first end 309 of the cylindrical body 302 towards the second end 311 of the cylindrical body 302, each tine 314 is offset radially and axially relative to the previous tine 314 such that the pattern of all of the tines 314 together has the appearance of a partial helix. The second set 318 of tines 314 are arranged similarly such that they have a pattern appearing as a partial helix opposite the first set 316 of tines 314. Together, the first set 316 of tines 314 and the second set 318 of tines 314 form the partial double helical pattern.

The helical pattern does not make a complete revolution about the rotor 300, and is therefore only a partial double helix. In some embodiments, the tines 314 of the first set 316 of tines 314 are offset from one another such that the last tine 320 of the first set 316 is positioned one hundred and forty-two degrees around the cylindrical body relative to the first tine 322 of the first set 316.

A second section 324 of tines 314 is positioned between the first section 312 of tines 314 and the second end 311 of the cylindrical body 302. Like the first section 312 of tines 314, the second section 324 is arranged in a partial helical pattern with the first tine 326 having an angular offset from the last tine 332. This second partial helical pattern has the same angular direction as the first partial helical pattern, but is offset angularly from the first set 312. For example, a first tine 326 of the second set 324 is offset from the last tine 320 of the first set 312 by an angle greater than the angular offset between neighboring tines in each of the pluralities of tines. In some embodiments, the first tine 326 is offset from the last tine 320 by an angle of ninety degrees.

A third section 328 of tines 314 is positioned between the second section 324 of tines 314 and the second end 311 of the cylindrical body 302. The third section 328 is arranged in a partial double helical pattern similar to the second section 324, but is offset angularly from the second section 324 and the double helical pattern twists in an angular direction opposite the first section 312 and the second section 324. In some embodiments, a first tine 330 of the third section 328 may be offset from a last tine 332 of the second section 324 by ninety degrees. The first tine 330 of the third section 328 may be inline longitudinally with the last tine 332 of the second section 324, such that four tines 314 sweep the same location when the cylindrical body 302 is rotated about its axis 304. In some embodiments, the location having four tines is at the middle of the length of the cylindrical body.

A fourth section 334 of tines 314 is positioned between the third section 328 of tines 314 and the second end 311 of the cylindrical body. The fourth section 334 is angularly offset from the third section 328 such that a first tine 336 of the fourth section 334 may have an angular offset relative to the last tine 338 of the third section 328 greater than the angular offset between neighboring tines in each of the pluralities of tines. The angular offset may be in the same angular direction as the prior angular offsets. The fourth section 334 has tines 314 that are arranged in a double helical pattern that twists in the same angular direction as the pattern of tines in the third section 328, which is opposite the angular direction of the pattern of the first section 312 and the second section 324. In some embodiments, the angular offset between the first tine 336 of the fourth section 334 and the last tine 328 of the third section 328 is ninety degrees.

In some embodiments, each of the sections of tines has a total of twenty-two tines 314 divided into two sets of eleven tines 314. Each tine 314 within a section of tines may be angularly offset from its neighboring tine 314 by about thirteen degrees, such that from the first tine of a section of tines 314 to the last tine of a section of tines 314 there is a total angular offset of one hundred forty-two degrees.

An optional end tine 340 is positioned between the first tine 322 of the first section 312 and the first end 309 of the cylindrical body 302. The end tine 340 has an angular orientation that matches the angular orientation of the first tine 322 of the first section 312 such that there is only a longitudinal offset with no angular offset between the first tine 322 and the end tine 340. Similarly, an optional end tine 342 is positioned between the fourth section 334 and the second end 311 of the cylindrical body 302. The end tine 342 has the same angular orientation as a last tine 344 of the fourth section of tines.

In the embodiment of FIGS. 3 and 4, each tine 314 has a corresponding tine 314 on an opposite side of the cylindrical body 302 that has the same longitudinal position, such that the two tines 314 sweep the same path when the cylindrical body 302 is rotated about its axis 304.

Figure 5:
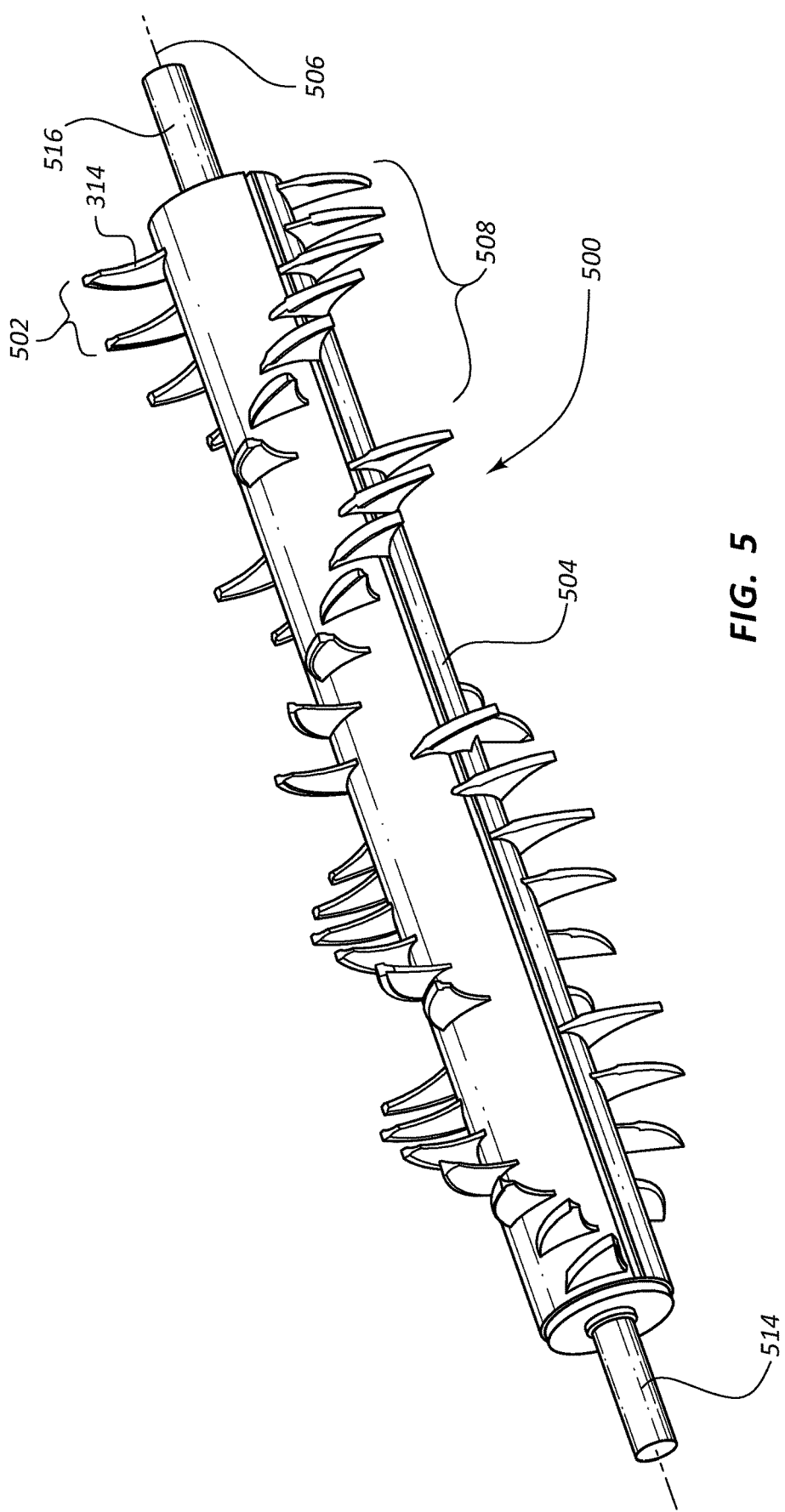
FIG. 5 illustrates an embodiment of a high speed rotor for a bagging machine.
Figure 6:
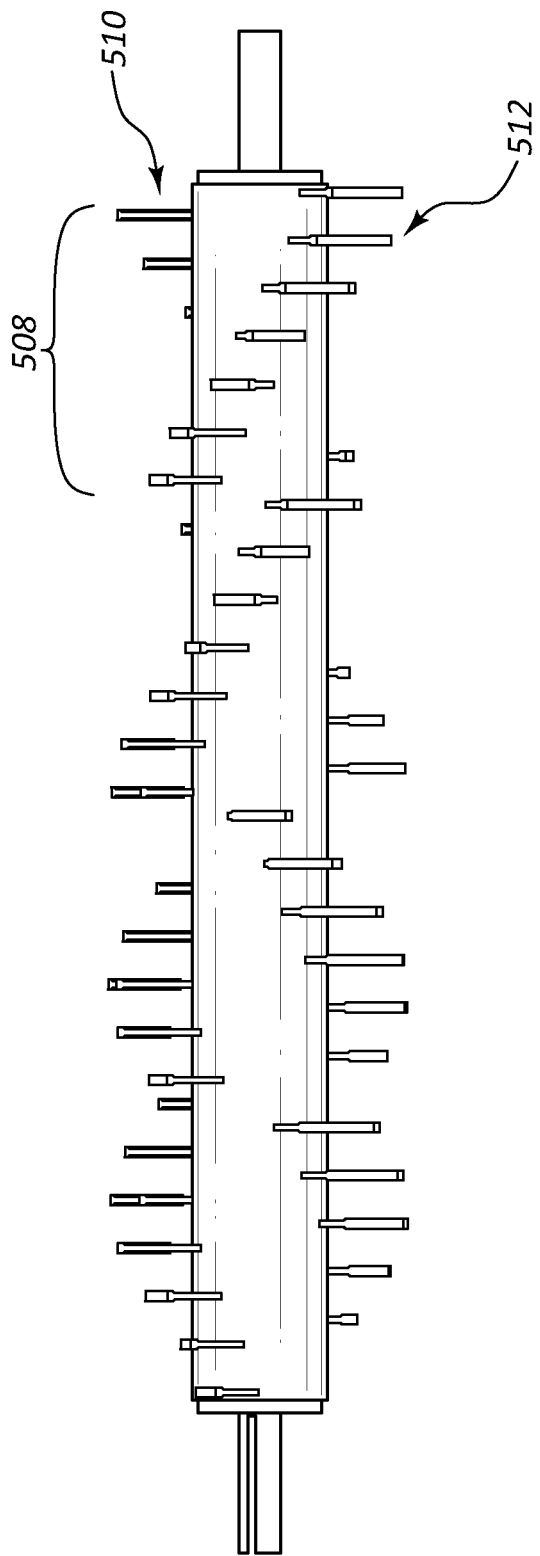
FIG. 6 illustrates another view of the rotor of FIG. 5.

FIGS. 5 and 6 illustrate an embodiment of a high speed rotor 500 for use in a bagging machine 100. The rotor 500 of FIGS. 5 and 6 is similar to the rotor 300 of FIGS. 3 and 4, having a cylindrical body 504 with pluralities of tines 314 arranged in patterns of partial double helixes. However, each tine 314 does not have a corresponding tine 314 on the opposite side of the cylindrical body 504. Instead, the spacing 502 between adjacent tines 314 is increased along with the angular offset, such that the spacing 502 has a corresponding tine 314 on an opposite side of the cylindrical body 504. When the cylindrical body 504 is rotated about its central axis 506, most tines 314 sweep their own path, and in some embodiments, no two tines 314 sweep 314 the same path. Thus, when passing through a comb, only a single tine 314 may pass through each space between teeth of the comb during a revolution of the rotor 500.

Because of the increased spacing between tines 314, there is a reduction in the total number of tines 314 in each partial double helix. In some embodiments, the number of tines 314 in a first section 508 is eleven, with six tines 314 in a first group 510, and five tines 314 in a second group 512 opposite the first group 510. In some embodiments, each tine 314 is spaced apart from an adjacent tine by a distance 502 greater than two times the width of a tine 314. The angular offset between tines may be about twenty-six degrees. In some embodiments, the rotor 500 of FIGS. 5 and 6 may have patterns of tines similar to the patterns of the embodiments of FIGS. 3 and 4, with the exception that every other tine has been removed. The reduced number of tines 314 reduces the amount of silage that the rotor 500 feeds with each rotation of the cylindrical body 504 relative to the rotor 300 of FIG. 3.

Because the rotor 500 of FIG. 5 feeds less silage with each rotation, it has a lower throughput than the rotor of FIG. 3 throughout conventional operating speeds. Additionally, less torque is required to rotate the rotor, since less silage is fed with each rotation. In a normal bagging machine, the rotor 500 of FIG. 5 would result in an unsatisfactory low output compared to the rotor of FIG. 3. However, it has been found that the design of FIG. 5 is able to operate at higher rotational speeds than the rotor of FIG. 3 before reaching its full capacity. Therefore, it is possible to obtain similar, if not greater, output from the rotor of FIG. 5 relative to the rotor of FIG. 3 by rotating the rotor 500 at a higher rate. In some embodiments, the rotor 500 may rotate at ninety RPM during bagging operations.

Past bagging machines often required large amounts of gear reduction to achieve the torque necessary to turn the rotors during bagging operations. Conventional rotors, such as the rotor 200 illustrated in FIG. 2, have typically been supported similar to the rotor of FIG. 3, with a first end having a spline for receiving a drive shaft and a second end having a bearing for supporting the rotor. Due to packaging constraints, the torque source is typically mounted remote from the rotor, and the necessary torque is transferred by a belt or other power transmission mechanism. Transferring large amounts of torque requires large belts or other mechanisms, therefore it is advantageous for at least a portion of the gear reduction to occur close to the rotor. For this reason, conventionally a final set of planetary gears is often coupled directly to the rotor as a final drive.

The rotor of FIG. 5, in contrast does not require as much torque as the rotor of FIG. 2 or FIG. 3. As shown in FIG. 5, the rotor 500 has a first cylindrical protrusion 514 and a second cylindrical protrusion 516, which may have a diameter less than the cylindrical protrusion of FIG. 4. The first and second cylindrical protrusion 514, 516 may be sized smaller than the cylindrical protrusion of FIG. 4 since they do not have to handle as much torque. Furthermore, by transmitting the torque to both the first end and the second end, the cylindrical protrusions 514, 516 may be sized even smaller. If the rotor 500 requires half as much torque to rotate and is driven at both ends, the cylindrical protrusions 514, 516 only have to carry one fourth of the torque relative to the splined connection of FIG. 3.

Other high speed rotor designs are possible. For example, the conventional rotor of FIG. 2 may be converted into a high speed rotor by removing every other tine, leaving a rotor similar to that of FIG. 5, but with only two partial double helical patterns of tines. With every other tooth removed, as the rotor is rotated only a single tine will pass through the space between teeth on a comb during a revolution of the rotor. With the reduction in the number of tines, the rotor would need to be rotated faster to compensate for the loss in throughput at conventional rotational speeds. While this design is not optimal, it provides some of the benefits of the rotor of FIG. 5 without requiring a new rotor, only modification of an existing rotor.

Figure 7:
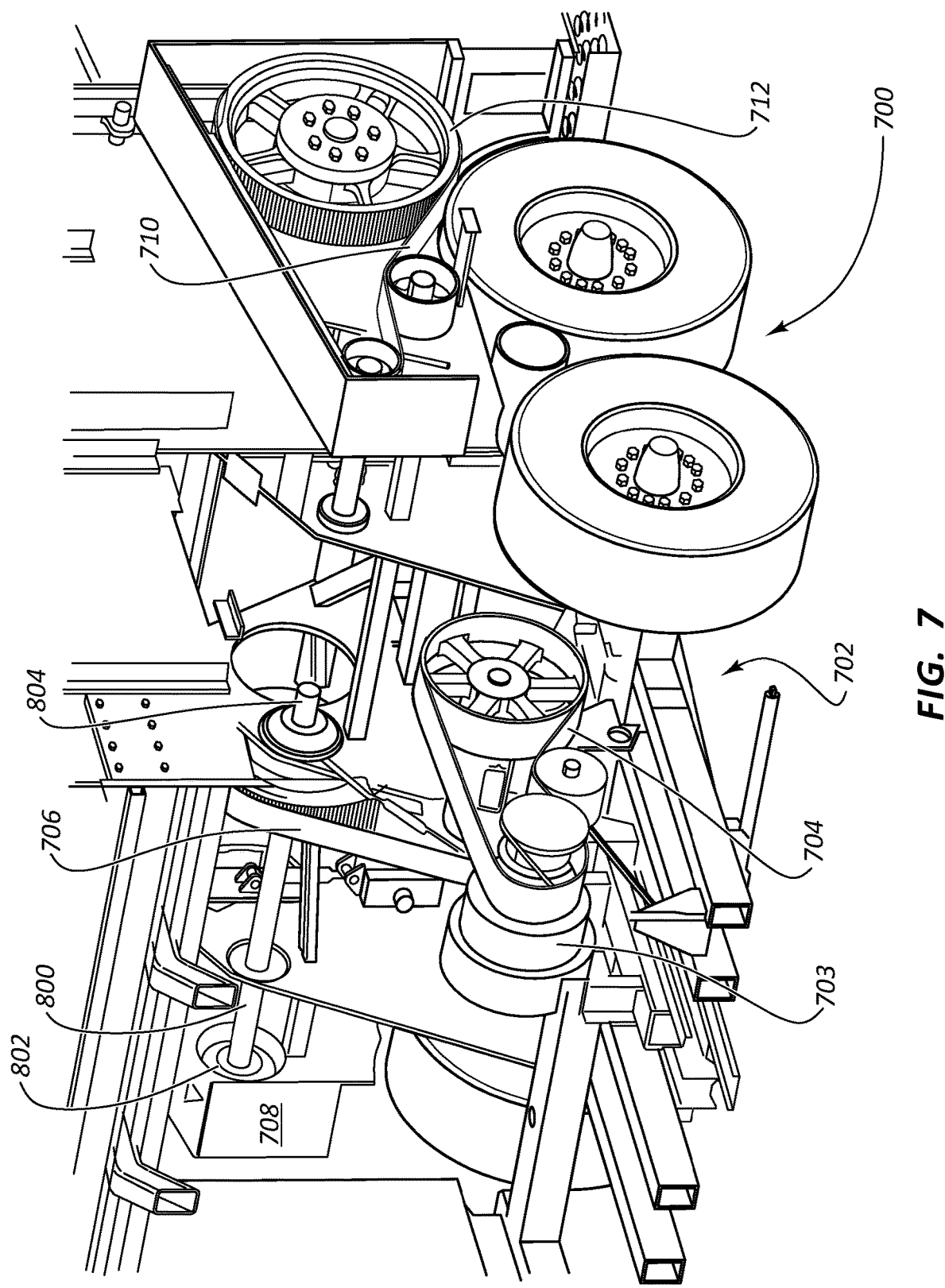
FIG. 7 illustrates a high speed drive assembly for turning a high speed rotor.

FIG. 7 illustrates a bagging machine 700 having a drive assembly 702 suitable for use with a high speed rotor 500 (not illustrated in this figure for clarity) as previously described. The drive assembly 702 includes a clutch 703, a first belt drive 704, a second belt drive 706, and a third belt drive 708. Each belt drive reduces the speed of the torque source and multiplies the available torque. The third belt drive 708 is split into two similar belt drives on either side of the bagging machine 700, although only one is shown for clarity. A final drive wheel 712 of the third belt drive 708 is coupled direction to the cylindrical protrusions of the high speed rotor 500.

Because the high speed rotor 500 requires less gear reduction and torque relative to a conventional rotor 200, and the rotor 300 of FIG. 3, it is possible to drive the high speed rotor 500 directly with the third belt drive 708. The third belt drive 708 may have half the torque capacity relative to a drive assembly for a conventional rotor. Furthermore, the belt drive 708 of FIG. 7 drives the rotor 500 at the first end cylindrical protrusion 514 and the second cylindrical protrusion 516, allowing the belt drive to be separated into two drive components. Each drive component requires half the torque that would be required of a single drive. The reduced capacity requirement of the components allows for the use of a thinner belt 710, with reduces the overall width of the bagging machine 700.

Embodiments are further directed to a method for bagging silage with a high speed rotor. In the method, silage is fed into a table, such as hopper 102. The silage is urged into a bulkhead opening, such as packing assembly 104. The packing assembly 104 has a comb with teeth and a high speed rotor having tines that pass through the comb as the rotor rotates. The tines are spaced longitudinally such that no two tines pass through the same space between teeth of the comb. The high speed rotor is rotated at a speed greater than eighty revolutions per minute. As the rotor rotates, the tines pass through the comb into the silage. The teeth then drag the silage out through the bulkhead opening and into a tunnel holding a bag. The silage is then directed into the bag.

From the foregoing it can be seen that the described embodiments allow for a high speed bagging machine that uses less torque while allowing for even packing of silage. The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:
1. A bagging machine, comprising:
   a feed table;
   a bagging tunnel; and
   a packing assembly between the feed table and the bagging tunnel, the packing assembly comprising:
      a bulkhead comprising a comb having a plurality of teeth;
      a rotor configured to rotate about an axis and having a plurality of tines extending perpendicular to the axis, each tine of the plurality of tines aligning with a space between two teeth from among the plurality of teeth, wherein no tine aligns with the same space as another tine; and
      a rotating drive coupled to the rotor,
   wherein the rotor comprises:
      a cylindrical body having a first end, a second end opposite the first end, and a cylindrical surface;
      a first plurality of tines extending from the cylindrical surface between the first end and the second end, the first plurality of tines forming a first partial double helical pattern in a first direction about the cylindrical surface;

a second plurality of tines extending from the cylindrical surface between the first plurality of tines and the second end, the second plurality of tines forming a second partial double helical pattern in the first direction and having an angular offset relative to the first helical pattern;

a third plurality of tines extending from the cylindrical surface between the second plurality of tines and the second end, the third plurality of tines forming a third partial double helical pattern in a second direction opposite the first direction; and a fourth plurality of tines extending from the cylindrical surface between the third plurality of tines and the second end, the third plurality of tines forming a fourth partial double helical pattern in the second direction and having an angular offset relative to the third helical pattern.

2. The bagging machine of claim 1, wherein the rotating drive is coupled to a first end of the rotor through a first belt connection and a second end of the rotor opposite the first end through a second belt connection.

3. The bagging machine of claim 1, wherein the drive turns the rotor at a speed greater than eighty revolutions per minute during operation.

4. The bagging machine of claim 1, wherein the drive is coupled to the rotor through a plurality of belts.

5. The bagging machine of claim 2, wherein the rotating drive distributes power evenly between the first belt connection and the second belt connection.

6. A method for bagging silage, comprising:
feeding silage onto a table;
urging the silage into a bulkhead opening, having a comb with a plurality of teeth and a rotor having a plurality of tines, with each tine positioned to pass through a space between adjacent teeth, wherein no two tines pass through the same space;
rotating the rotor with a rotary drive coupled to a first end of the rotor and a second end of the rotor opposite the first end; and
directing silage from the rotor into a bag.

7. The method of claim 6, wherein the rotor is rotated at a speed greater than eighty revolutions per minute.

8. A bagging machine, comprising:
a feed table;
a bagging tunnel; and
a packing assembly between the feed table and the bagging tunnel, the packing assembly comprising:
a bulkhead comprising a comb having a plurality of teeth;
a rotor configured to rotate about an axis and having a plurality of tines extending perpendicular to the axis, each tine of the plurality of tines aligning with a space between two teeth from among the plurality of teeth, wherein no tine aligns with the same space as another tine; and
a rotating drive coupled to the rotor,
wherein the rotating drive is coupled to a first end of the rotor through a first belt connection and a second end of the rotor opposite the first end through a second belt connection.

9. The bagging machine of claim 8, wherein the drive turns the rotor at a speed greater than eighty revolutions per minute during operation.

10. The bagging machine of claim 8, wherein the drive is coupled to the rotor through a plurality of belts.

11. The bagging machine of claim 8, wherein the rotating drive distributes power evenly between the first belt connection and the second belt connection.

12. The bagging machine of claim 11, wherein the rotor comprises:
a cylindrical body having a first end, a second end opposite the first end, and a cylindrical surface;
a first plurality of tines extending from the cylindrical surface between the first end and the second end, the first plurality of tines forming a first partial double helical pattern in a first direction about the cylindrical surface; and
a second plurality of tines extending from the cylindrical surface between the first plurality of tines and the second end, the second plurality of tines forming a second partial double helical pattern in a second direction opposite the first direction.

13. The bagging machine of claim 8, wherein the rotor comprises:
a cylindrical body having a first end, a second end opposite the first end, and a cylindrical surface;
a first plurality of tines extending from the cylindrical surface between the first end and the second end, the first plurality of tines forming a first partial double helical pattern in a first direction about the cylindrical surface;
a second plurality of tines extending from the cylindrical surface between the first plurality of tines and the second end, the second plurality of tines forming a second partial double helical pattern in the first direction and having an angular offset relative to the first helical pattern;
a third plurality of tines extending from the cylindrical surface between the second plurality of tines and the second end, the third plurality of tines forming a third partial double helical pattern in a second direction opposite the first direction; and
a fourth plurality of tines extending from the cylindrical surface between the third plurality of tines and the second end, the third plurality of tines forming a fourth partial double helical pattern in the second direction and having an angular offset relative to the third helical pattern.

14. The bagging machine of claim 13, wherein an end tine is position between the first plurality of tines and the first end.

15. The bagging machine of claim 14, wherein the end tine has an angular orientation that matches an angular orientation of the first plurality of tines.

16. The bagging machine of claim 13, wherein an end tine is position between the fourth plurality of tines and the second end.

17. The bagging machine of claim 16, wherein the end tine has an angular orientation that matches an angular orientation of the fourth plurality of tines.

* * * * *

UNITED STATES PATENT AND TRADEMARK OFFICE
CERTIFICATE OF CORRECTION

| | |
|---|---|
| PATENT NO. | : 10,863,676 B2 |
| APPLICATION NO. | : 16/517075 |
| DATED | : December 15, 2020 |
| INVENTOR(S) | : Cullen |

It is certified that error appears in the above-identified patent and that said Letters Patent is hereby corrected as shown below:

On the Title Page

Item (73), please correct the Assignee name as follows:
"SRC Innovations, LLP" should read --SRC Innovations, LLC--.

Signed and Sealed this
Fifteenth Day of November, 2022

*Katherine Kelly Vidal*

Katherine Kelly Vidal
*Director of the United States Patent and Trademark Office*